US007463340B2

(12) United States Patent
Krishnaswamy

(10) Patent No.: US 7,463,340 B2
(45) Date of Patent: Dec. 9, 2008

(54) LADAR-BASED MOTION ESTIMATION FOR NAVIGATION

(75) Inventor: Kailash Krishnaswamy, Little Canada, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/692,651

(22) Filed: Mar. 28, 2007

(65) Prior Publication Data
US 2008/0239279 A1    Oct. 2, 2008

(51) Int. Cl.
*G01P 3/36* (2006.01)
(52) U.S. Cl. ...................................... 356/28
(58) Field of Classification Search ............. 356/28
See application file for complete search history.

(56) References Cited

U.S. PATENT DOCUMENTS

| 4,671,650 | A | * | 6/1987 | Hirzel et al. ............... 356/28 |
| 5,200,606 | A | * | 4/1993 | Krasutsky et al. .......... 250/216 |
| 5,894,323 | A | * | 4/1999 | Kain et al. ................. 348/116 |
| 6,445,983 | B1 | | 9/2002 | Dickson et al. |
| 2006/0287083 | A1 | * | 12/2006 | Ofek et al. .................. 463/37 |

OTHER PUBLICATIONS

Campbell et al., "Flash—Ladar Inertial Navigator Aiding", Position, Location, and Navigation Symposium, 2006, pp. 677-683, Publisher: IEE.

Harris et al., "A Combined Corner and Edge Detector", 1988, pp. 147-151, Publisher: The Plessey Company, Published in: United Kingdom.

Horn et al., "Closed-Form Solution of Absolute Orientation Using Orthonormal Matrices", Journal of the Optical Society of America, Jul. 1988, pp. 1127-1135, vol. 5, No. 7, Publisher: Optical Society of America.

Lucas et al., "An Iterative Image Registration Technique With an Application to Stereo Vision", Proc 7th Intl Joint Conf on Artificial Intelligence (IJCAI), Aug. 24, 1981, pp. 674-679, Published in: Vancouver, British Columbia.

Tomasi et al., "Shape and Motion From Image Streams: A Factorization Method—Part 3 Detection and Tracking of Point Features", Technical Report CMU-CS-91-132, Apr. 1991, pp. 1-20.

* cited by examiner

*Primary Examiner*—Thomas H. Tarcza
*Assistant Examiner*—Luke D Ratcliffe
(74) *Attorney, Agent, or Firm*—Fogg & Powers LLC

(57) ABSTRACT

A method for estimating motion with at least one laser radar is disclosed. The method involves scanning a first range image at a first time, locating a plurality of object features in the first range image, scanning a second range image at a second time, receiving motion data for a time period between the first and second times, and locating the plurality of object features in the second range image based, at least in part, on the motion data to determine an orientation of the object. Based on the orientation of the object, the method estimates motion by comparing the location of the plurality of object features in the first scanned range image to the location of the plurality of object features in the second scanned range image.

20 Claims, 3 Drawing Sheets

LADAR-BASED MOTION ESTIMATION FOR NAVIGATION

This application is related to commonly assigned U.S. patent application Ser. No. 11/673,893, filed on Feb. 12, 2007 and entitled "SYSTEM AND METHOD FOR MOTION ESTIMATION USING VISION SENSORS" (the '893 application). The '893 application is incorporated herein by reference.

BACKGROUND

Many guidance, control, and navigation (GNC) applications provide precise navigation when necessary. For example, precision landing of a military aircraft or spacecraft requires precise navigation. In addition, unmanned vehicles, such as unmanned aerial vehicles (UAV) also require accurate position and velocity information in order to properly navigate an area (target). Most of these GNC applications employ one or more global positioning system (GPS) sensors to achieve a necessary level of navigation precision. In addition, stringent requirements on precision landing and navigation dictate stringent performance requirements for the GNC application.

Various methods and systems have been employed to meet these stringent performance requirements. Interest point (corner) detection extracts certain types of point features and estimates contents of the target image. Corner detection is frequently used in navigation, motion detection, and image tracking and recognition. An interest point is a point in the image which has a well-defined position that is suitable for detection, such as the intersection of two edges (that is, a corner). Corner detection quality is typically based on detecting the same corner in multiple images, which are similar but not identical (for example, multiple images having different lighting, translation, and rotation). Simple approaches to corner detection of multiple images often become very computationally expensive and generate less than adequate results.

An inertial measurement unit (IMU) measures acceleration in a plurality of directions. The IMU uses the measured accelerations to estimate motion in each of the measured directions. Unfortunately, the IMU measurements are subject to measurement drift that adversely affects the accuracy of the IMU measurements. Available GPS satellite data updates the IMU measurements, improves the accuracy of the position and velocity data, and periodically corrects any accuracy errors in the IMU measurements. When the GPS satellite data is not available, however, the motion estimates are not available in real time. Furthermore, when results are not immediately available, these stringent performance requirements are violated.

SUMMARY

The following specification discusses ladar-based motion estimation for navigation. This summary is made by way of example and not by way of limitation. It is merely provided to aid the reader in understanding some aspects of one or more embodiments described in the following specification.

Particularly, in one embodiment, a method for estimating motion with at least one laser radar is provided. The method involves scanning a first range image at a first time, locating a plurality of object features in the first range image, scanning a second range image at a second time, receiving motion data for a time period between the first and second times, and locating the plurality of object features in the second range image based, at least in part, on the motion data to determine an orientation of the object. Based on the orientation of the object, the method estimates motion by comparing the location of the plurality of object features in the first scanned range image to the location of the plurality of object features in the second scanned range image.

DRAWINGS

These and other features, aspects, and advantages are better understood with regard to the following description, appended claims, and accompanying drawings where:

DETAILED DESCRIPTION

The following detailed description describes at least one embodiment for ladar-based motion estimation for navigation using a laser radar (ladar) to estimate motion. Advantageously, the ladar, in communication with an inertial measurement unit (IMU), provides motion estimates of a host vehicle by using absolute orientation between three-dimensional (3-D) point features. Over a prescribed time period, the motion estimates provide real-time, multi-dimensional navigation information of the host vehicle to one or more navigational monitoring systems in communication with the host vehicle.

Figure 1:
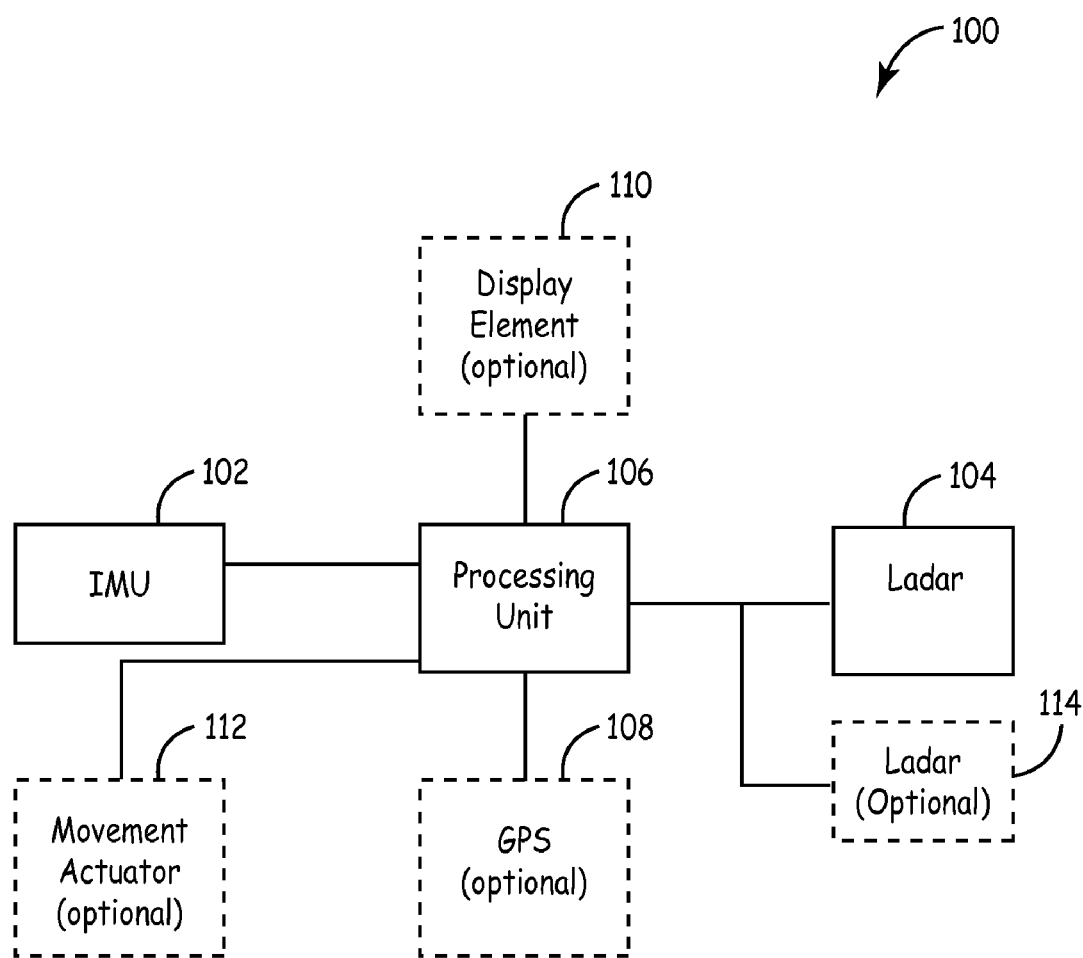
FIG. 1 is a block diagram of an embodiment of a motion estimation system.

FIG. 1 is a block diagram of an embodiment of a motion estimation system 100. The system 100 comprises at least a processing unit 106, an IMU 102, and a ladar 104. The ladar 104 and the IMU 102 are each coupled to the processing unit 106 and provide input data to the processing unit 106 for estimating motion (for example, position, velocity and a combination thereof). In one implementation, the system 100 further comprises at least one optional GPS sensor 108, an optional display element 110, and an optional movement actuator 112, each of which are in communication with the processing unit 106. In this and alternate implementations, the system 100 resides on at least one of an aircraft, an automobile, a spacecraft, a UAV, and any other host vehicle that requires real-time, multi-dimensional navigation information.

In the example embodiment of FIG. 1, the IMU 102 measures motion in at least three degrees of freedom. In particular, the IMU 102 includes at least three sensors to measure acceleration along three orthogonal coordinate axes. For example, the IMU 102 comprises, but is not limited to, three linear accelerometers configured to obtain acceleration along the three coordinate axes. In other words, the accelerometer measurements are used to estimate position and velocity, including the effects of gravity. As described in further detail below, the processing unit 106 determines an absolute orientation (position) of the system 100 based on the motion measured by the IMU 102.

The ladar 104 transmits light (for example, a laser) out to a target, as further discussed below with respect to FIG. 2. The transmitted light interacts with and is modified by the target. For example, at least some of the transmitted light is reflected (scattered) back to the ladar 104 for analysis by the processing unit 106. The change in the properties of the light enables at least one property (for example, at least one point feature, such as a corner) of the target to be determined.

In one implementation, the ladar 104 is at least one of a scanning ladar, a flash ladar, and a Doppler ladar. It is understood that the ladar 104 is suitable for implementation in any appropriate manner for emitting a laser radar signal using any other current and future 2-D and 3-D laser radar technology. The range finder ladar 104 measures the distance from the ladar 104 in the vehicle to a target by emitting the light in a single (for example, a horizontal) direction. The time for the light to travel out to the target and back to the range finder ladar is used to determine the range to the target. Similarly, the flash ladar 104 measures the distance from the ladar 104 in the host vehicle of the system 100 to a target by emitting the light in multiple directions at substantially the same time. The Doppler ladar 104 measures the velocity of the target. When the light transmitted from the Doppler ladar hits the target moving towards or away from the Doppler ladar, the wavelength of the light reflected (scattered) off the target will be changed slightly. This is considered the Doppler shift of the Doppler ladar 104. For example, if the target is moving away from the Doppler ladar 104, the return light will have a longer wavelength; if moving towards the Doppler ladar 104, the return light will be at a shorter wavelength.

Positions based on the IMU 102 measurements are corrected (updated) with measurements from the optional GPS sensor 108. Position data from the GPS sensor 108 does not drift as with data from the IMU 102. When the GPS data is unavailable, one or more positions based on the IMU 102 are updated (corrected) with measurements from the ladar 104. In one implementation, the ladar 104 is used in conjunction with the GPS sensor 108. For example, the ladar 104 can be used whenever a GPS satellite signal is unavailable or concurrently with the GPS sensor 108 regardless of availability of a GPS satellite signal. Alternatively, the GPS sensor 108 is omitted in some embodiments. In such embodiments, data from the IMU 102 is only updated with measurements from the ladar 104.

The ladar 104 is configured to scan an area near the system 100 at a first time. The ladar 104 is implemented as any appropriate device for scanning ranges using, but not limited to, a range finder (line scan) laser radar, a flash laser radar (flash scan), and a Doppler laser radar. It is understood that the system 100 is capable of accommodating any appropriate number of ladars (for example, at least one ladar 104) in a single system 100. In one embodiment, the system 100 includes an (optional) ladar 114 substantially similar to the ladar 104. The (optional) ladar 114 is (optionally) configured to scan the area near the system 100 at a second time.

The processing unit 106 comprises a plurality of program instructions for carrying out the various process tasks, calculations, and generation of signals and other data used in the operation of the system 100, such as to correlate the location of point features of a target, and to determine the velocity and position of the device in which system 100 is located. The system 100 uses the ladar 104 to correct and update the target position based on IMU data from the IMU 102. In some embodiments, the calculated position based on the IMU data from the IMU 102 is combined with the calculated position from the ladar 104. In other embodiments, the calculated position from the ladar 104 is used in place of the calculated position based on the IMU data from the IMU 102. In such embodiments, the IMU 102 estimates the location of 3-D point features in a plurality of scans captured by the ladar 104. It is understood that the plurality of scans discussed in the present application refer to at least one of a plurality of line scans, flash scans, and Doppler scans.

In operation, the IMU 102 measures acceleration of a vehicle in at least three degrees of freedom. The IMU 102 transfers the measured acceleration to the processing unit 106. The processing unit 106 processes the plurality of scans from the ladar 104 as a plurality of scan images. In particular, the ladar 104 scans a first scan image at a first time T1 and a second scan image at a second time T2. In an alternate embodiment, the ladar 104 scans the first scan image at the first time T1 and the (optional) ladar 114 scans the second scan image at the second time T2. The processing unit 106 locates a plurality of features in each of the two scan images from the time T1. The processing unit 106 correlates the location of the plurality of features in one of the two scan images with the location of the one or more features in the other scan image.

The processing unit 106 calculates an estimated position and velocity using the measured acceleration from the IMU 102. The estimated position and velocity is used by the processing unit 106 together with the location of the plurality of features in the scan images of the time T1 to estimate the location of the plurality of features in at least one of the scan images of the time T2. Based on these estimates, the processing unit 106 determines the actual location of the plurality of features in the scan image of the time T2 by focusing on a small area around the estimated position. The small area is defined by the possible error in the measurements of the IMU 102. Once the actual location of the one or more features is determined, the processing unit 106 calculates the position and velocity of the host vehicle based on a comparison of the location of the one or more features (that is, the absolute orientation) between the scan images from the time T1 and the scan images from the time T2 as described in further detail below with respect to FIG. 2.

In one implementation, the processing unit 106 combines the estimated positions and velocities from the IMU 102 and the ladar 104 to obtain a more accurate motion estimate. Alternatively, the processing unit 106 uses the motion estimate from the ladar 104. The more accurate estimate is (optionally) displayed on a display element 110, in some embodiments. For example, an automobile using the system 100 (as the host vehicle) will use the display element 110 to display to a driver of the automobile where the host vehicle is located on a map. In other embodiments, the processing unit 106 uses the more accurate estimate to determine the necessary actions to take in order to reach a programmed destination. Moreover, the processing unit 106 generates control signals which are sent to the optional movement actuator 112 to control the movement of the host vehicle. For example, the processing unit 106 controls the movement of a UAV in real time based on control signals transmitted to the movement actuator 112 (such as the throttle, wing flaps, and the like) in the UAV to control at least the pitch, yaw, and thrust of the UAV.

By correlating the location of point features from each of the scan images processed by the processing unit 106 at a first moment in time with the location of point features from each of the scan images processed in the processing unit 106 at a second moment in time, the processing unit 106 determines the position and velocity of the host vehicle. The processing unit 106 is configured to estimate the location of the point features in the scans from the ladar 104 at the second moment in time based on data received from the IMU 102 and the location of the point features in scans obtained at the first moment in time. The estimation of the location of the point features in the second image is described in more detail below with respect to FIGS. 2 and 3. The processing unit 106 locates the point features in the second image using absolute orientation by scanning the point features in a smaller area located around an estimated location of the point features. Once the actual location of the features is identified, the processing unit 106 calculates the change in position of the host vehicle.

Figure 2:
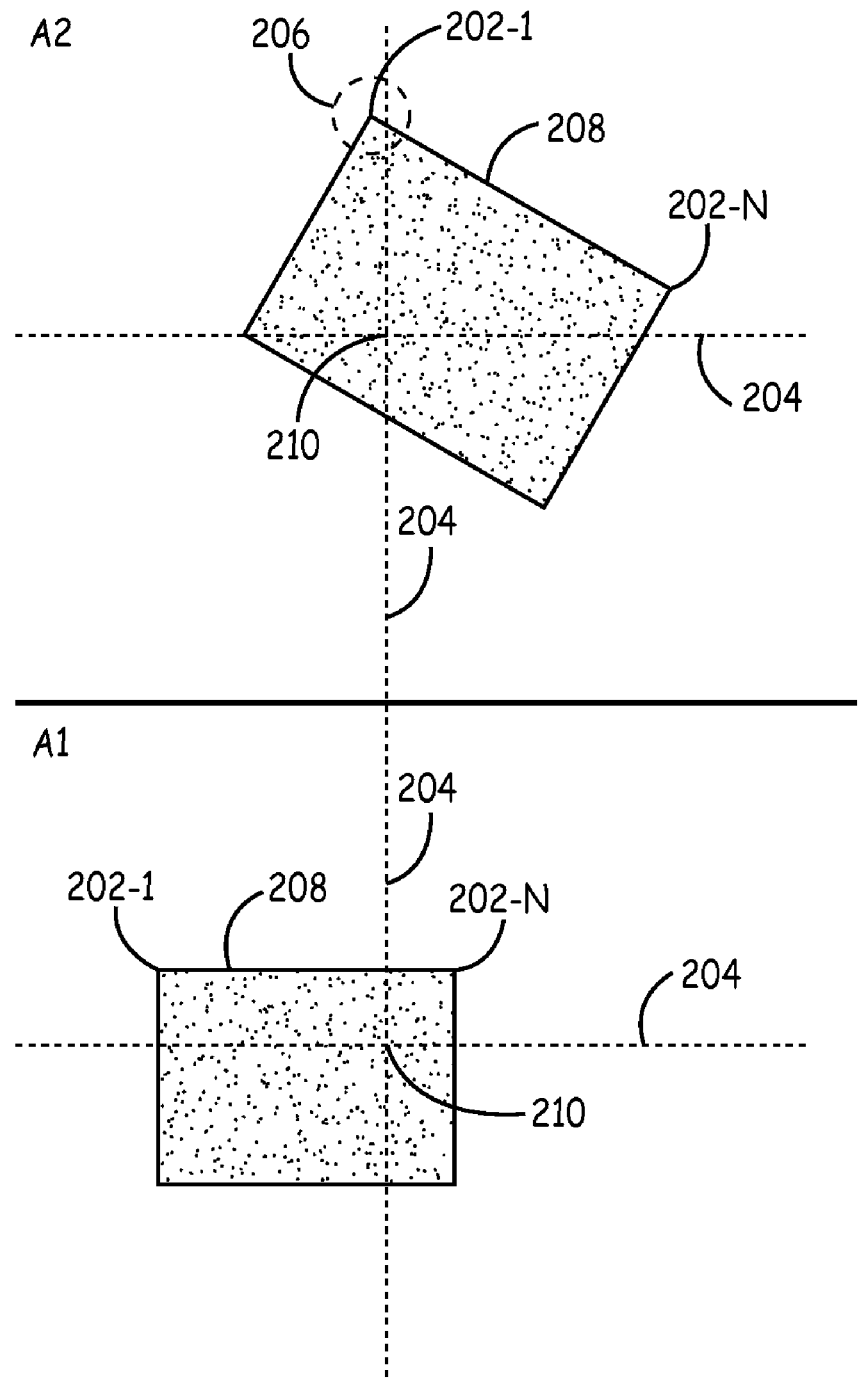
FIG. 2 is a model of an object detected by the system of FIG. 1.

FIG. 2 is a model of an object 208 detected by the system 100 at different ranges as detected by the ladar 104 of FIG. 1. In particular, the ladar 104 captures a scan image A1 at time T1 and a scan image A2 at time T2. The scan images A1 and A2 are provided by way of explanation and not by way of limitation. It is to be understood that the object 208 and the scan images A1 and A2 will vary in operation depending on the area near the object 208 in which the system 100 is located. In particular, although the object 208 is shown as a rectangle in FIG. 2, it is to be understood that in other embodiments the object 208 is any appropriate object from which absolute orientation and motion estimates are determined (for example, the object 208 is at least one of a tunnel, a building, a tower, a tree, a river, and the like).

The object 208 is comprised of a plurality of features $202_1$ to $202_N$. A feature, as used herein, refers to any set of one or more scans that have a high contrast (for example, a well-defined point) with respect to the surrounding scans in the images A1 and A2. Also shown in each of the scan images A1 and A2 are coordinate axes 204. The coordinate axes 204 are provided for purposes of explanation, but are not necessary for operation. In particular, the coordinate axes 204 demonstrate the relative position of the object 208 in each of the scan images A1 and A2.

In operation, the ladar 104 obtains the scan image A1 at the time T1 and the scan image A2 and the time T2. As illustrated in FIG. 2, the object 208 is offset differently from a center 210 in the scan image A1 than in the scan image B2. Once the scan images A1 and A2 are captured, the processing unit 106 locates the features $202_1$ to $202_N$ in each of the scan images A1 and A2. Once the features $202_1$ to $202_N$ are located, the processing unit 106 correlates the respective locations of each of the features 202 in the scan image A1 with the same features 202 in the scan image A2. For example, the processing unit 106 correlates the location of feature $202_1$ in the scan image A1 with the location of feature $202_1$ in the scan image A2. Any appropriate technique will locate the features $202_1$ to $202_N$ (for example, at least one of a Harris corner detector and a Kanade-Lucas-Tomasi, or KLT, corner detector).

Once each of the features 202 are correlated, the processing unit 106 determines the position and attitude of the object 208. For example, in this embodiment, the vehicle that comprises the system 100 has banked and turned to the left as well as pitched downward. The movement of the vehicle causes the object 208 as depicted in the scan image A2, for example, to move and rotate to the right, and to move up in the scan image A2. In addition, the vehicle has moved toward the object 208 causing the object 208 to be larger in the scan image A2. Therefore, the features $202_1$ to $202_N$ in the scan image A2 are not located near the original position (that is, the scan location) of the features $202_1$ to $202_N$ in the scan image A1.

The processing unit 106 uses IMU data received from the IMU 102 to determine an approximate location of the features $202_1$ to $202_N$ in the scan image A2. For example, the processing unit 106 locates the feature $202_1$ in the scan image A1 as a starting point. The processing unit 106 propagates the location of the feature $202_1$ forward based on data received from the IMU 102 over the time period between time T1 and time T2. In propagating the location forward, the processing unit 106 identifies an area 206 in which the feature $202_1$ is located. The area 206 results from the known approximate error of measurements obtained from the IMU 102. For example, if the IMU 102 measures a lateral movement of 2 meters to the right over a time period of 1 second but has a known error of 0.1 meters/second, the actual location of feature $202_1$ is between 1.9-2.1 meters to the right of its location at time T1. The processing unit 106 evaluates the scans in the area 206 to identify the actual location of the feature $202_1$ in the scan image A2. Alternatively, the processing unit 106 evaluates scans successively further away from the estimated location of the feature $202_1$, starting with the scans adjacent to the estimated location, until the actual pixel location is identified. In such embodiments, the approximate error in the IMU data does not need to be known.

The processing unit 106 uses known techniques, such as the KLT corner detection, to locate the feature $202_1$ in the area 206. By focusing on the area 206 of the scan image A2 rather than the entire scan image, the processing unit 106 is able to locate the feature $202_1$ substantially faster than in known motion estimation systems that search substantially larger areas. The processing unit 106 uses the IMU data to estimate the location of the features $202_1$ to $202_N$. Once the actual location of the feature $202_1$ in the scan image A2 is located, the processing unit 106 calculates the absolute orientation of the remaining features 202 in the scan image A2. This calculation uses enhanced absolute orientation to correlate each of the features 202 read in the scan images A1 and A2 to provide a closed-form solution in calculating the absolute orientation. With knowledge of at least a portion of the motion change and at least a portion of a change in orientation of the features 202, motion estimates are determined as described above with a single 3-D ladar (for example, the ladar 104).

Figure 3:
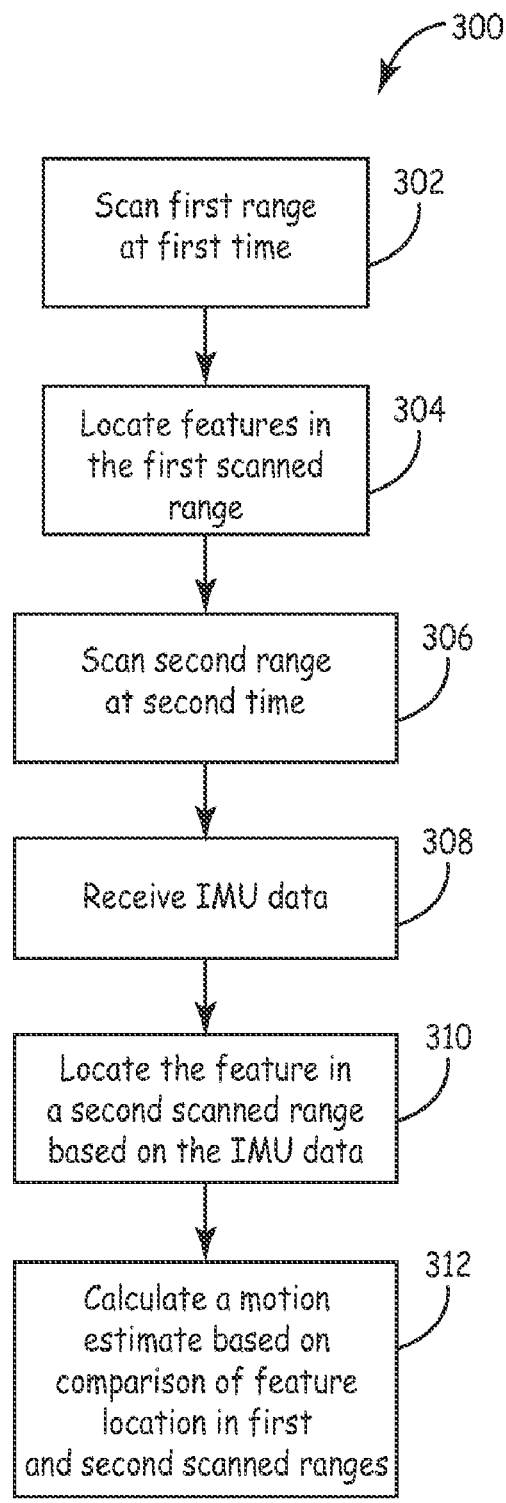
FIG. 3 is a flow diagram illustrating an embodiment of a method for estimating motion using the system of FIG. 1.

FIG. 3 is a flow diagram illustrating a method 300 for estimating motion using the system 100. The method 300 addresses estimating motion of the host vehicle with the processing unit 106 by using enhanced absolute orientation between the 3-D point features $202_1$ to $202_N$. Over a prescribed time period, the motion estimates provide real-time, multi-dimensional navigation information of the host vehicle to the one or more navigational monitoring systems in communication with the host vehicle.

At block 302, the ladar 104 scans a first range with the ladar 104 at a first time. The processing unit 106 locates the features $202_1$ to $202_N$ in the first scanned range image at block 304. At block 306, the ladar 104 scans a second range at a second time. The processing unit 106 receives data from the IMU 102 for a time period between the first and second times at block 308. In one implementation, the processing unit 106 combines a motion estimate based on IMU data from the IMU 102 with the motion estimate based on a comparison of the scan of the features $202_1$ to $202_N$ in the first range to the scan of the features $202_1$ to $202_N$ in the second range from the ladar 104. At block 310, the processing unit 106 locates the features $202_1$ to $202_N$ in the second scanned range image based at least in part on the IMU data from the IMU 102. At block 312, the processing unit 106 estimates motion of the object 208 using enhanced absolute orientation. The motion estimation of the object 208 is based on at least a partial comparison of the location of the features $202_1$ to $202_N$ in the first scanned range image to the location of the features $202_1$ to $202_N$ in the second scanned range image.

In one implementation, the processing unit 106 locates the features $202_1$ to $202_N$ based on the absolute orientation of the object 208 by correlating 3-dimensional object features $202_1$ to $202_N$ in the first range with 3-D object features $202_1$ to $202_N$ in the second range. The processing unit 106 correlates the features $202_1$ to $202_N$ using at least one of the KLT corner detection algorithm and the Harris corner detection algorithm. In at least the same (and alternate) implementation(s), the processing unit 106 receives a GPS signal from the (optional) GPS 108. In this implementation, the processing unit 106 estimates motion based, at least in part, on the GPS signal when the GPS signal is available from the optional GPS 108.

The processing unit 106 locates the features $202_1$ to $202_N$ in the second range based, at least in part, on the IMU data from the IMU 102. Using the IMU data, the processing unit 106 scans the features $202_1$ to $202_N$ in the first range at a first scan location, selects a second scan location in the at least one second range based on the IMU data and the first scan location, and evaluates range scans near the second scan location to identify the actual location of the features $202_1$ to $202_N$ in the at least one second range. In one implementation, the processing unit 106 evaluates the range scans near the second scan location by evaluating the range scans in an area substantially surrounding the second scan location. Moreover, the size of the area is determined based on the approximate error in the IMU data.

While the methods and techniques described here have been described in the context of a fully functioning motion estimation system, apparatus embodying these techniques are capable of being distributed in the form of a computer readable medium of instructions and a variety of forms that apply equally regardless of the particular type of signal bearing media actually used to carry out the distribution. Examples of computer readable media include recordable-type media, such as a portable memory device; a hard disk drive (HDD); a random-access memory (RAM); a read-only memory (ROM); transmission-type media, such as digital and analog communications links; and wired (wireless) communications links using transmission forms, such as (for example) radio frequency and light wave transmissions. The computer readable media may take the form of coded formats that are decoded for actual use in a particular motion estimation system by a combination of digital electronic circuitry and software (or firmware) residing in a programmable processor (for example, a special-purpose processor or a general-purpose processor in a computer).

This description has been presented for purposes of illustration, and is not intended to be exhaustive or limited to the form (or forms) disclosed. Furthermore, the present application is intended to cover any logical, electrical, or mechanical modifications, adaptations, or variations which fall within the scope of the following claims.

What is claimed is:

1. A method for estimating motion with at least one laser radar, the method comprising:
   scanning a first range image at a first time;
   identifying a plurality of object features in the first range image;
   scanning a second range image at a second time;
   receiving motion data from a host vehicle having the at least one laser radar for a time period between the first and second times;
   identifying the plurality of object features in the second range image based, at least in part, on the motion data of the host vehicle to determine an orientation of at least one object; and
   based on the orientation of the at least one object with respect to a change in position of the host vehicle, estimating motion of the host vehicle by comparing the location of the plurality of object features in the first scanned range image to the location of the plurality of object features in the second scanned range image.

2. The method of claim 1, and further comprising estimating motion of the host vehicle based on a combination of the motion data from the host vehicle and the absolute orientation of the at least one object.

3. The method of claim 1, and further comprising:
   receiving a global positioning signal; and
   estimating motion based, at least in part, on the global positioning signal when the global positioning signal is available.

4. The method of claim 1, wherein identifying the plurality of object features in the second range image based, at least in part, on the motion data of the host vehicle includes:
   locating the plurality of object features in the first range at a first scan location;
   selecting a second scan location in the at least one second range based on the motion data and the first scan location; and
   evaluating range scans near the second scan location to identify the actual location of the plurality of object features in the at least one second range.

5. The method of claim 4, wherein evaluating the range scans near the second scan location includes evaluating range scans in an area substantially surrounding the second scan location, wherein the size of the area is determined based on the approximate error in the motion data.

6. The method of claim 1, wherein estimating motion of the host vehicle comprises correlating the first and second scanned range images using an enhanced absolute orientation.

7. The method of claim 1, wherein estimating motion of the host vehicle by comparing the location of the plurality of object features comprises correlating 3-dimensional object features in the first range with 3-dimensional object features in the second range using at least one of a Kanade-Lucas-Tomasi corner detection algorithm and a Harris corner detection algorithm.

8. A motion estimation system, comprising:
   at least one laser radar configured to scan a first range at a first time and a second range at a second time;
   an inertial measurement unit configured to obtain motion data of a host vehicle for the time period between the first time and the second time; and
   a processing unit coupled to the inertial measurement unit and the at least one laser radar, the processing unit configured to:
      determine an enhanced absolute orientation of a plurality of 3-dimensional point features in at least one of the second ranges based at least in part on the motion data and a change in position of the host vehicle for the time period between the first time and the second time, and
      estimate motion of the host vehicle by comparing the enhanced absolute orientation of the plurality of 3-dimensional point features in the two first ranges with the enhanced absolute orientation of the plurality of 3-dimensional point features in the respective two second ranges.

9. The system of claim 8, wherein the at least one laser radar is at least one of a range finder ladar, a flash ladar, and a Doppler ladar.

10. The system of claim 8, and further comprising a movement actuator coupled to the processing unit, the movement actuator operable to control motion based on control signals received from the processing unit.

11. The system of claim 8, and further comprising a display element coupled to the processing unit, the display element operable to display motion estimates based on signals received from the processing unit.

12. The system of claim 8, and further comprising a global positioning system sensor coupled to the processing unit, wherein the processing unit is configured to estimate motion based on data received from at least one of the global positioning system sensor, the inertial measurement unit, and at least one laser radar.

13. The system of claim 8, wherein the processing unit is configured to combine a motion estimate from the motion data and a position estimate from the at least one laser radar to obtain a composite motion estimate.

14. The system of claim 8, wherein the processing unit is further configured to:
- identify a first scan location of the one or more 3-dimensional point features in each first range;
- select a second scan location in the at least one second range based on the motion data from the inertial measurement unit; and
- evaluate range scans near the second scan location to identify the actual scan location of the plurality of 3-dimensional point features in the at least one second range.

15. The system of claim 8, wherein the processing unit is configured to correlate the actual scan location of the plurality of 3-dimensional point features using at least one of a Kanade-Lucas-Tomasi corner detection algorithm and a Harris corner detection algorithm.

16. A program product comprising program instructions embodied on a processor-readable medium for execution by at least one programmable processor in a motion estimation system, wherein the program instructions are operable to cause the programmable processor to:
- identify one or more 3-dimensional point features of an object in each of two first laser radar scans at a first time;
- evaluate inertial measurement data of a host vehicle having the motion estimation system and navigating an area near the object for a time period between the first time and a second time;
- identify the one or more 3-dimensional point features in at least one of two second laser radar scans received at the second time based at least in part on the inertial measurement data;
- correlate the one or more 3-dimensional point features in the first laser radar scans to the one or more 3-dimensional point features in the second laser radar scans to determine an absolute orientation of the object; and
- output the calculated motion estimate based, at least in part, on the absolute orientation of the object and a change in position of the host vehicle within the area being navigated.

17. The program product of claim 16, wherein the program instructions are further operable to cause the programmable processor to:
- estimate the motion based on the inertial measurement data; and
- combine the inertial measurement motion estimate with the motion estimate based on a comparison of the location of the one or more 3-dimensional point features in the first laser radar scans to the location of the one or more 3-dimensional point features in the second laser radar scans.

18. The program product of claim 16, wherein the program instructions that identify the one or more 3-dimensional point features in the at least one of two second laser radar scans received at the second time cause the programmable processor to:
- identify a first scan location of the one or more 3-dimensional point features in each first laser radar scan;
- select a second scan location in the at least one second laser radar scan based on the inertial measurement data and the first scan location; and
- evaluate range scans near the second scan location to identify the actual location of the one or more 3-dimensional point features in the at least one second laser radar scan.

19. The program product of claim 18, wherein the program instructions that identify the one or more 3-dimensional point features in the at least one of two second laser radar scans received at the second time are further operable to cause the programmable processor to evaluate range scans in an area substantially surrounding the second scan location that identify the actual location of the one or more 3-dimensional point features in the at least one second laser radar scan, wherein the area is determined by an approximate error in the inertial measurement unit data.

20. The program product of claim 16, wherein the program instructions that correlate the one or more 3-dimensional point features in the first and second laser radar scans cause the programmable processor to use at least one of a Kanade-Lucas-Tomasi corner detection algorithm and a Harris corner detection algorithm to correlate the one or more 3-dimensional point features in an enhanced absolute orientation method.

* * * * *